(12) United States Patent
Otsuki et al.

(10) Patent No.: US 7,229,719 B2
(45) Date of Patent: Jun. 12, 2007

(54) NON-AQUEOUS ELECTROLYTE SECONDARY BATTERY

(75) Inventors: Masashi Otsuki, Musashimurayama (JP); Shigeki Endo, Tokorozawa (JP); Takao Ogino, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 351 days.

(21) Appl. No.: 10/275,008

(22) PCT Filed: May 2, 2001

(86) PCT No.: PCT/JP01/03788

§ 371 (c)(1), (2), (4) Date: Oct. 31, 2002

(87) PCT Pub. No.: WO01/86746

PCT Pub. Date: Nov. 15, 2001

(65) Prior Publication Data

US 2003/0108801 A1    Jun. 12, 2003

(30) Foreign Application Priority Data

| May 8, 2000 | (JP) | ............................. 2000-134683 |
| May 8, 2000 | (JP) | ............................. 2000-134684 |
| May 8, 2000 | (JP) | ............................. 2000-134685 |
| Jun. 5, 2000 | (JP) | ............................. 2000-167468 |

(51) Int. Cl.
*H01M 6/18* (2006.01)

(52) U.S. Cl. ...................... 429/332; 429/331; 429/330; 429/339; 429/231.1; 429/231.4; 429/231.8; 252/62.2

(58) Field of Classification Search ................. 429/326, 429/328, 331, 332, 330, 231.1, 322, 323, 429/231.4, 231.8, 339; 252/62.2
See application file for complete search history.

(56) References Cited

U.S. PATENT DOCUMENTS

| 5,824,433 | A | * | 10/1998 | Angell et al. .............. 252/62.2 |
| 6,455,200 | B1 | * | 9/2002 | Prakash et al. ............. 429/322 |
| 6,475,679 | B1 | * | 11/2002 | Tsutiya et al. .............. 429/324 |

FOREIGN PATENT DOCUMENTS

| JP | A 6-13108 | | 1/1994 |
| JP | A 10-12274 | | 1/1998 |
| JP | A 11-162510 | | 6/1999 |
| JP | 2000-30740 | * | 1/2000 |
| JP | A 2000-30740 | | 1/2000 |
| JP | A 2001-102088 | | 4/2001 |

* cited by examiner

Primary Examiner—Laura Weiner
(74) Attorney, Agent, or Firm—Oliff & Berridge, PLC

(57) ABSTRACT

A highly safe non-aqueous electrolyte secondary cell with excellent self-extinguishing property or flame retardancy is provided which comprises an anode, a cathode, a non-aqueous electrolyte in which an Li-salt as a supporting salt is dissolved in an organic solvent, and a separator. When a high crystalline carbon material such as graphite is used as cathode active substances, it is possible to provide a non-aqueous electrolyte secondary cell whose charging/discharging life is lengthened, whose interface resistance at the non-aqueous electrolyte can be reduced, and which has excellent discharging characteristics at low temperature.

10 Claims, No Drawings

NON-AQUEOUS ELECTROLYTE SECONDARY BATTERY

TECHNICAL FIELD

The present invention relates to non-aqueous electrolyte secondary cells for notebook-type personal computers or cellular phones in which risk of explosion or ignition especially at the time of a short circuit is reduced and excellent cell characteristics are simultaneously accomplished. More particularly, the present invention relates to non-aqueous electrolyte secondary cells using, as active substances for a cathode, a high crystalline carbon material such as graphite.

BACKGROUND ART

Conventionally, nickel-cadmium cells have been the main cells used, particularly as secondary cells for memory-backups or sources for driving the memory-backups of AV (Audio Visual) and information devices such as personal computers, and VTRs (video tape recorders). Lately, non-aqueous electrolyte secondary cells have been drawing a lot of attention as a replacement for the nickel-cadmium cells because non-aqueous electrolyte secondary cells have advantages of high voltage, high energy density, and displaying excellent self-dischargeability. Various developments of the non-aqueous electrolyte secondary cells have been attempted and a portion of these developments have been commercialized. For example, more than half of notebook type personal computers, cellular phones and the like are driven by the non-aqueous electrolyte secondary cells.

Lithium ion secondary cells using carbon materials that are capable of injecting or removing lithium as active substances for a cathode are the most commercially available materials for the non-aqueous electrolyte secondary cells. Various organic solvents are used for electrolytes of lithium ion secondary cells in order to mitigate the risk when lithium is produced on the surface of cathode, and to increase outputs of driven voltages. For example, electrolytes in which lithium salts are dissolved in mixed solvents of cyclic carbonates and non-cyclic carbonates are widely known (Japanese Patent Application Laid-Open (JP-A) Nos. 2-172162, and 4-171674).

Further, in non-aqueous electrolyte secondary cells for use in cameras, alkali metals (especially, lithium metals or lithium alloys) are used as cathode materials, and electrolytes thereof ordinarily use aprotic organic solvents such as ester organic solvents.

However, although these non-aqueous electrolyte secondary cells are high performance cells, they have a problem with safety as described below.

First, when alkali metals (especially, lithium metals or lithium alloys) are used as cathode materials for non-aqueous electrolyte secondary cells, the alkali metals are extremely highly-active with respect to water. Accordingly, when a non-aqueous electrolyte secondary cell is imperfectly sealed and water enters therein, a problem is caused in that hydrogen is generated due to a reaction of the cathode materials and water, leading to a high risk of ignition or the like.

Moreover, since lithium metals have a low melting point (about 170° C.), they have a problem in that, when a large current suddenly flows into a cell during a short circuit or the like, the cell generates an extreme amount of heat, leading to a high risk of melting the lithium metal of the cell, or the like.

Further, a problem occurs in that the electrolyte comprising the aforementioned organic solvent vaporizes or decomposes due to the heat-generation of the cell, generates gas, and causes an explosion or ignition.

In order to solve the aforementioned problems, for example, a method has been proposed of providing a cylindrical cell with a mechanism for suppressing flow of excessive current, which exceeds a predetermined amount, into the cell by operating a safety valve as well as by breaking an electrode terminal when internal pressure of the cell increases in accordance with the increase of the temperature of the cell during a short circuit or overcharge of the cell (Nikkan Kogyo Shinbun, *Electronic Technology*, Vol. 39, No. 9, 1997).

However, the mechanism cannot be relied upon to operate normally all the time. In cases in which the mechanism does not operate normally, a problem still remains because it is feared that an amount of heat due to the excessive current will increase, resulting in a risk of ignition or the like.

Accordingly, in order to solve the aforementioned problems, development of a highly safe non-aqueous electrolyte secondary cell, which reduces the aforementioned risks and is not a safety measure providing an attachment part such as a safety valve, is desired.

Performance has been developed to improve performance of the non-aqueous electrolyte secondary cells, and active substances themselves have been studied to improve capacity characteristics thereof. Of the active substances, evolution of carbon materials is noticeable, and of the carbon materials, it has been disclosed that high crystalline carbon materials such as graphite and graphitized carbons are excellent from the viewpoints of having large charging/discharging capacity per unit weight, low average potential during charging/discharging, and large energy density (JP-A Nos. 57-208079 and 5-13088). Low crystalline carbon materials have also been noticed for comprising highly conductive solvents such as ethylene carbonate (EC), γ-butyrolactone (γ-BL) or propylene carbonate (PC) or mixtures thereof with highly dielectric solvents without being limited to the same.

However, it is known that the carbon materials used as active substances for a cathode might have poor compatibility depending upon the type of the electrolytes.

For example, it has been disclosed that propylene carbonate or butylene carbonate i.e., cyclic carbonate decompose at cathodes, and are thereby unsuitable as electrolytes (JP-A Nos. 2-10666 and 4-184872).

It is also known that, when γ-butyrolactone, dimethyl ether (DME) and tetrahydrofuran (THF) are used as electrolytes, a problem is caused in that cathodes and electrolytes react with each other to form coatings on cathode surfaces, increasing interface resistance and deteriorating charging/discharging characteristics at low temperature.

In order to improve the charging/discharging characteristics at low temperature, it has been disclosed that use of electrolytes containing 2-methyltetrahydrofuran (2-MeTHF) as solvent components is effective. It has also been disclosed that electrolytes in which ethylene carbonate (EC) is added to 2-MeTHF tend to show longer charging/discharging duration (U.S. Pat. No. 4,737,424 (1998)).

However, it is known that 2-MeTHF is a combustible solvent which has a low flash point (−11° C.), is volatile and combustible, and is easily oxidized to thereby easily generate explosive peroxides. Accordingly, a problem with safety has been pointed out. With respect to this combustible electrolyte, it is desired to decrease an amount of the electrolyte used and to increase flame retardancy.

In order to prevent decomposition of electrolytes at cathodes, since ethylene carbonate (EC) shows appropriate stability even when used with high crystalline carbon materials, EC is used as an electrolyte having excellent cyclic characteristics. However, since EC has a high freezing point (37° C.) and deteriorates discharging characteristics at low temperature, the EC cannot be used alone. In order to obtain non-aqueous electrolyte secondary cells having excellent discharging characteristics at low temperature, ethylene carbonate (EC) must be mixed with tetrahydrofuran (THF), diethyl carbonate (DEC), dimethyl carbonate (DMC), methylethyl carbonate (MEC) or the like. For example, a three-component mixture of ethylene carbonate (EC), dimethyl carbonate (DMC) or diethyl carbonate (DEC), and ethylmethyl carbonate (EMC) has been proposed (JP-A No. 5-13088).

However, in accordance with a mixing ratio in the three-component mixture described above, ethylene carbonate (EC) is crystallized at low temperature of −20° C., and conductivity decreases, whereby discharging capacity is greatly decreased.

Further, since all of these mixture-type electrolytes are combustible solutions, in the same manner as described above, the problem remains in that the mixture-type electrolytes have an extremely high risk of ignition or the like.

DISCLOSURE OF INVENTION

An object of the present invention is to solve the conventional problems described above and to accomplish the following objects. Namely, an object of the present invention is to provide a highly safe non-aqueous electrolyte secondary cell having excellent self-extinguishing property or flame retardancy. Further, another object of the present invention is to provide a highly safe non-aqueous electrolyte secondary cell in which duration of charging/discharging life is long, and interface resistance at the non-aqueous electrolyte is low, and which has excellent discharging characteristics at low temperature even when a carbon material such as graphite is used for a cathode.

In order to solve the aforementioned facts, an aspect of the present invention is a non-aqueous electrolyte secondary cell comprising an anode, a cathode, a non-aqueous electrolyte including a supporting salt and a phosphazene derivative.

Another aspect of the present invention is a non-aqueous electrolyte secondary cell comprising: an anode including as an active substance a lithium complex oxide containing at least one transition metal; a cathode; a non-aqueous electrolyte in which an Li-salt is dissolved in an organic solvent as a supporting salt; and a separator, wherein the organic solvent contains a phosphazene derivative.

BEST MODE FOR CARRYING OUT THE INVENTION

A description of the present invention will be made in more detail hereinafter.

A non-aqueous electrolyte secondary cell of the present invention comprises an anode, a cathode, and a non-aqueous electrolyte, and, if necessary, other materials.

[Anode]

Materials for an anode are not particularly limited, and can be appropriately selected from any known anode materials, and used. Preferable examples of anode materials include: metal oxides such as $V_2O_5$, $V_6O_{13}$, $MnO_2$, $MoO_3$, $LiCoO_2$, $LiNiO_2$, and $LiMn_2O_4$; metal sulfides such as $TiS_2$ and $MoS_2$; and conductive polymers such as polyaniline. Among these, lithium complex oxides such as $LiCoO_2$, $LiNiO_2$ and $LiMn_2O_4$, which contain at least one of transition metals are preferable as active substances for anodes because they are safe, have high capacity, and are excellent in wettability with respect to electrolytes. The materials can be used alone or two or more thereof can be used in combination.

Lithium complex oxides contain at least one of transition metals such as vanadium, manganese, iron, cobalt, nickel, and the like. Among these, layered lithium complex oxides having an $\alpha$-$NaFeO_2$ base structure such as cobalt or nickel and lithium complex oxides having a Spinel base structure such as manganese are preferable since they have high average discharging potentials. Further, layered lithium complex oxides mainly containing therein lithium/nickel complex oxides are more preferable because of their excellent cycle characteristics.

An anode is structured by homogeneously mixing powders of active substance such as the lithium complex oxides, a binder for bonding the powders, and, if necessary, powders of auxiliary conductive material and by pasting this mixture with pressurization molding or a solvent. This is coated and dried, and thereafter pressed and solidified, and used. Further, anodes may have a structure in which solidified matters are fixed on collectors.

Auxiliary conductive material powders are not particularly limited as long as they have conductive effects and resistances against both non-aqueous electrolytes and electrochemical reactions at anodes. Examples of the auxiliary conductive material powders include graphite powder, carbon black, cokes powder, and conductive high polymers. It is preferable that an amount of the auxiliary conductive material powders with respect to 100 parts by weight of active substance powders is about 1 to 20 parts by weight.

A binder is not particularly limited as long as it has bonding effects, and resistances against both non-aqueous electrolytes and electrochemical reaction at anodes (or cathodes). Examples of binder include fluororesins such as polytetrafluoroethylene (PTFE) or polyvinylidene fluoride (PVDF), polyethylene, and polypropylene. It is preferable that an amount of binder with respect to 100 parts by weight of active substance powders is about 1 to 20 parts by weight.

A collector is not particularly limited as long as it has resistances against both a non-aqueous electrolyte and electrochemical reactions at an anode (or cathode). Examples of collector include nickel, titanium, stainless steel, copper and aluminum. In order to increase volume energy density as a cell, the thinner the thickness of a collector, the more preferable, as long as strength of collectors can be ensured. The thickness of the collector is preferably about 5 to 100 µm. Aluminum foils, which are inexpensive and easily processed into a thin film, are preferably used for an anode collector.

Configuration of an anode is not particularly limited, and can be suitably selected from known configurations as electrodes, such as sheet, sold-cylindrical, plate and spiral-shaped configurations.

[Cathode]

Materials for a cathode are not particularly limited as long as they can absorb and discharge lithium or lithium ions. The cathode can be selected appropriately from known cathode materials, and used. Preferable examples of cathode materials containing lithium include: lithium metal itself; alloys in which lithum is mixed with aluminum, indium, lead or zinc; and a lithium-doped carbon material such as graphite. These materials can be used alone or two or more thereof can be used in combination.

Among the materials, it is preferable to use a carbon material such as graphite because it is highly safe. In particular, it is preferable to use a carbon material (sometimes, referred to as a high crystalline carbon material) whose lattice surface interval value d ($d_{002}$) at a (002) lattice surface is 3.35 to 3.37 Å in an X-ray diffraction. Here, the lattice surface interval value d ($d_{002}$) means a value measured by an X-ray diffraction method (entitled "Carbon fibers" written by Sugiro Otani (pp. 733 to 742) (1986)), published by Kindai Henshusha) in which a Cuk$\alpha$ ray is used as an X-ray and high purity silicon is used as a standard substance. The high crystalline carbon materials are categorized in a group of graphites or graphitized carbons, and have large $d_{002}$ values. Accordingly, a clear distinction is drawn between low crystalline cokes and the high crystalline carbon materials.

As cathode materials, it is preferable to use graphite whose lattice surface interval value ($d_{002}$) in the X-ray diffraction is 3.37 Å or less and whose true specific gravity is 2.23 or more, and it is more preferable to use graphite whose lattice surface interval value ($d_{202}$) in the X-ray diffraction is 3.36 Å or less and whose true specific gravity is 2.24 or more.

Graphite contains therein ash preferably in an amount of 0.5 wt % or less and more preferably in an amount of 0.1 wt % or less. In a case of natural graphite, although the content of ash in natural graphite varies according to producing districts, the content of ash in natural graphite is generally large to reach several wt % or more. Accordingly, it is preferable to treat natural graphite by heat at high temperature. The temperature of heat is preferably 2500° C. or more, and more preferably 2800° C. or more. The content of ash in natural graphite is preferably 0.5 wt % or less and more preferably 0.1 wt % or less. Here, the contents of ash in graphite/natural graphite are values measured by JIS M8812.

A particle size of graphite type carbon materials is not particularly limited. However, an average particle diameter of the graphite carbon materials is preferably about 1 to 50 μm, and more preferably 2 to 20 μm. Further, a ratio of an amount of graphite with respect to the graphite carbon material is preferably 70 wt % or more, and more preferably 90 wt % or more.

Example of graphite includes natural graphite or artificial graphite. Examples of artificial graphite include squama-like graphite (SGP5, SGP15, SGO5, and SGX5 manufactured by SEC Co., Ltd., and SFG6, SFG15, KS6, and KS15 manufactured by LONZA Inc.), spherical graphite (MCMB6-28, and MCMB20-28 manufactured by OSAKA GAS Co., Ltd., and fibrous graphite (SG241 and F500 manufactured by OSAKA GAS Co., Ltd.).

When the graphite type carbon materials are used as cathode materials, a lump of graphite or graphitized carbon is mechanically ground and used as it is. Further, the graphite type carbon material can be subjected to a pretreatment such as a refining treatment, a heating treatment (500 to 3000° C.), an acidic treatment, an alkaline treatment, or an inflating treatment.

Examples of carbon materials other than graphite include carbon black, cokes, and a so-called pseudo-graphite carbon black obtained by heating carbon black at about 1,500 to 3,000° C.

A cathode can be structured such that the aforementioned lithium alloy is rolled or such that after powders of a high crystalline carbon material such as graphite and a binder for binding these powders are homogeneously mixed, this mixture is pasted by using a pressurizing molding or a solvent, and coated, dried, pressed and solidified, and, as needed, fixed on a collector.

The binder and collector can use almost the same binder and collector as described in the anode. In the case of a collector used for a cathode, a copper foil is preferably used because the copper foil is difficult to make alloys with lithium and can easily be processed into thin films.

Configuration of a cathode is not particularly limited, and can appropriately be selected from known configurations in the same manner as those of the above-described anode.

[Non-aqueous Electrolyte]

As a non-aqueous electrolyte, it is preferable to use a non-aqueous electrolyte containing therein a supporting salt, and a phosphazene derivative whose viscosity at 25° C. is 300 mPa·s (300 cP) or less or 500 mPa·s (500 cP) or less, or a non-aqueous electrolyte in which the supporting salt is dissolved in an organic solvent containing therein the phosphazene derivative. Both of the non-aqueous electrolytes contain other components, if necessary.

-Supporting Salt-

A supporting salt is not particularly limited. However, a Li salt that becomes ion source of a lithium ion is preferable. Specific examples of the Li salt include $LiPF_6$, $LiAsF_6$, $LiSbF_6$, $LiClO_4$, $LiCF_3SO_3$, $LiC_4F_9SO_3$, $Li(CF_3SO_2)_2N$, $Li(C_2F_5SO_2)_2N$, $LiC(CF_3SO_2)_3$, $LiCF_3CO_2$, $LiAlCl_4$, $LiBr$ $(C_6H_5)_4$, and $LiB(C_6H_5)_4$. These can be used alone or two or more thereof can be used in combination.

Among them, $LiPF_6$, $LiBF_4$, and $Li(CF_3SO)_2N$ are preferable from the viewpoint that they can provide non-aqueous electrolyte cells with excellent discharging characteristics at low temperature. Further, $LiPF_6$ is particularly preferable from the viewpoint of high flame retardancy.

In the non-aqueous electrolyte containing a phosphazene derivative whose viscosity at 25° C. is 300 mPa·s (300 cP) or less, or 500 mPa·s (500 cP) or less, concentration of the aforementioned Li salt with respect to a solvent component (1 kg) is preferably 0.2 to 1 mol, and more preferably 0.5 to 1 mol. Further, in the non-aqueous electrolyte in which the supporting salt is dissolved in the organic solvent containing the phosphazene derivative, the concentration of the aforementioned Li salt with respect to a solvent component (1 kg) is preferably 0.5 to 1.5 mol/l, and more preferably 0.6 to 1.2 mol/l.

If the concentration of the Li salt is no more than a lower limit of each of the above-described preferable ranges (i.e., 0.2 mol/kg for the former electrolyte and 0.5 mol/l for the latter electrolyte), sufficient conductivity of the non-aqueous electrolytes cannot be secured, whereby a case may occur in which charging/discharging characteristics of cells are damaged. Meanwhile, if concentration of the Li salt is not smaller than an upper limit of each of the above-described preferable ranges (i.e., 1 mol/kg for the former electrolyte and 1.5 mol/l for the latter electrolyte), viscosity of the non-aqueous electrolytes increases, sufficient mobility of the lithium ion or the like cannot be secured, and sufficient conductivity of the non-aqueous electrolytes cannot be secured, whereby a case may occur in which charging/discharging characteristics of the cells are damaged.

-Organic Solvent-

A non-aqueous electrolyte containing a phosphazene derivative, whose viscosity at 25° C. is 500 mPa·s (500 cP) or less, contains therein an aprotic organic solvent. For this reason, the non-aqueous electrolyte becomes incombustible, whereby explosion and/or ignition of the non-aqueous electrolyte secondary cell are suppressed. Further, since the aprotic organic solvent does not react with cathode materials, higher safety can be obtained. Moreover, since the aprotic organic solvent is able to lower the viscosity of the non-aqueous electrolyte, optimum ionic conductivity for non-aqueous electrolyte secondary cells can easily be accomplished.

Also in a non-aqueous electrolyte containing a phosphazene derivative whose viscosity at 25° C. is 300 mPa·s (300 cP) or less, the aprotic organic solvent is added to the non-aqueous electrolyte, if necessary, in order to make the non-aqueous electrolyte incombustible, suppress explosion and/or ignition of the non-aqueous electrolyte secondary cell, improve the safety, and decrease the viscosity of the non-aqueous electrolyte.

The viscosity of the aprotic organic solvent at 25° C. is preferably 3.0 mPa·s (3.0 cP) or less, and more preferably 2.0 mPa·s (2.0 cP) or less.

When the viscosity of the aprotic organic solvent exceeds 3.0 mPa·s (3.0 cP), a case may occur in which an effect in which the aprotic organic solvent and the phosphazene derivative are used together is not exhibited in the non-aqueous electrolyte whose viscosity at 25° C. is 500 mPa·s (500 cP) or less and which contains the photophazene.

Examples of the aprotic organic solvent are not particularly limited but include: eter compounds and ester compounds, such as 1,2-dimethoxyethane, tetrahydrofuran, dimethyl carbonate, diethyl carbonate, diphenyl carbonate, ethylene carbonate, propylene carbonate, γ-butyrolactone, γ-valerolactone, methylethyl carbonate, and ethylmethyl carbonate from the viewpoint of providing a non-aqueous electrolyte having low viscosity. Among these, cyclic ester compounds such as ethylene carbonate, propylene carbonate, and γ-butyrolactone, chain ester compounds such as 1,2-dimethoxyethane, dimethyl carbonate, ethylmethyl carbonate, and diethyl carbonate, and the like are preferable. The cyclic ester compounds are particularly preferable in that they have high relative dielectric constants and excellent solubility with lithium salts or the like, while the chain ester compounds are particularly preferable in that they have low viscosity, and are able to lower the viscosity of the non-aqueous electrolyte. These compounds can be used alone or two or more thereof can be used in combination. However, use of two or more of the compounds is preferable.

Preferable examples of compositions of the organic solvent in the present invention include: 15 to 60 vol % (preferably 25 to 45 vol %) of a cyclic carbonic ester; 10 to 80 vol % (preferably 30 to 52 vol %) of a non-cyclic ester; and 1.5 to 50 vol % (preferably 2.5 to 40 vol %, and more preferably 3 to 40 vol %) of a phosphazene derivative (Pz).

If the volume percentage of the cyclic carbonic ester is less than 15 vol %, it is not preferable because a dielectric constant of the non-aqueous electrolyte is decreased, and solubility of the cyclic carbonic ester with a Li salt deteriorates. Further, if the volume percentage of the cyclic carbonic ester exceeds 60 vol %, it is not preferable because low temperature characteristics (for example, −10° C., −20° C. or the like) deteriorate. Especially when ethylene carbonate is used as the cyclic carbonic ester, since ethylene carbonate has high freezing point, low temperature characteristics tend to deteriorate.

The cyclic carbonic ester is preferably at least one selected from a group of ethylene carbonate (EC), propylene carbonate (PC), and butylene carbonate (BC).

If the volume percentage of the non-cyclic carbonic ester is less than 10 vol %, it is not preferable because the viscosity of the non-aqueous electrolyte becomes high, whereby conductivity with Li-ions becomes insufficient. Further, if the volume percentage of the non-cyclic ester exceeds 80 vol %, it is not preferable because combustibility of the non-cyclic ester becomes high.

The non-cyclic carbonic ester is preferably at least one selected from a group of dimethyl carbonate (DMC), diethyl carbonate (DEC), and ethylmethyl carbonate (EMC).

Preferable examples of compositions of the organic solvent according to the present invention include: as a cyclic carbonic, 15 to 60 vol % (preferably 25 to 45 vol %) of ester ethylene carbonate (EC); as non-cyclic esters, 5 to 50 vol % (preferably 15 to 45 vol %) of dimethyl carbonate (DMC) or diethyl carbonate (DEC) and 5 to 30 vol % (preferably 5 to 20 vol %) of ethylmethyl carbonate (EMC); and 1.5 to 50 vol % (preferably more than 2.5 to 40 vol % and more preferably 3 to 40 vol %) of a phosphazene derivative (Pz).

If the volume percentage of dimethyl carbonate (DMC) or diethyl carbonate (DEC) is below 5 vol %, it is not preferable because the viscosity of the non-aqueous electrolyte becomes high and conductivity deteriorates. Further, if the volume percentage of dimethyl carbonate or diethyl carbonate exceeds 50 vol %, it is not preferable because the non-aqueous electrolyte is frozen at low temperature and becomes unable to discharge.

Further, if the volume percentage of ethylmethyl carbonate (EMC) is less than 5 vol %, it is not preferable because the discharge capacity of the cell at low temperature (for example, −10° C., −20° C. or the like) is small. This is considered because freezing points of both ethylmethyl carbonate and dimethyl carbonate are respectively high (34° C. and 0° C.), the non-aqueous electrolytes are frozen even if a solute is dissolved therein in an amount of about 1 mol/l. Further, the volume percentage of ethylmethyl carbonate exceeds 30 vol %, it is not preferable because combustibility becomes high.

Preferable examples of compositions of the organic solvent according to the present invention include: 40 to 90 vol % (preferably 50 to 90 vol %) of γ-butyrolactone (γ-BL); and 10 to 60 vol % (preferably 10 to 50 vol %) of a phosphazene derivative (Pz).

If the volume percentage of γ-butyrolactone (γ-BL) is less than 40 vol %, it is not preferable because load characteristics (high rate discharge characteristics) deteriorate noticeably, and low temperature discharge characteristics also deteriorate. Further, if the volume percentage of γ-butyrolactone (γ-BL) exceeds 90 vol %, it is not preferable because it becomes difficult for high crystalline carbon materials to contain non-aqueous electrolytes, and decomposition of solvents occurs at the surface of the carbon materials during charging, whereby cells can hardly charge and duration of charging/discharging life is shortened.

In order to improve duration of charging/discharging life, it is preferable to use the organic solvent whose composition comprises: 15 to 60 vol % of ethylene carbonate (EC); 10 to 50 vol % of diethyl carbonate (DEC); and 3 to 50 vol % of a phosphazene derivative (Pz).

-Phosphazene Derivative-

From the viewpoint of ionic conductivity, it is necessary that the phosphazene derivative in the non-aqueous electrolyte of the present invention is liquid at ordinary temperature (25° C.).

An example of a non-aqueous electrolyte secondary cell using a technology in which phosphazene compounds are applied to cell materials includes a total solid cell in which polyphosphazene (such as methoxyethoxy-polyphosphazene and oligoethyleneoxy-polyphosphazene) is used as a solid electrolyte. However, in this cell, effects due to flame retardancy are highly expected. However, as compared to ordinary liquid electrolyte, ionic conductivity was extremely low i.e., 1/1000 to 1/10000, whereby the cell was used only within a range of a limited low discharging current. Further, it was difficult for the cell to obtain excellent cyclic characteristics.

On the other hand, as the phosphazene derivatives are liquid, the present invention can provide almost the same level of conductivity as that of ordinary liquid electrolyte and excellent cyclic characteristics.

In the non-aqueous electrolyte secondary cell according to an aspect of the present invention, the viscosity of the phosphazene derivative contained in the non-aqueous electrolyte at 25° C. must be 300 mPa·s (300 cP) or less, and preferably 100 mPa·s (100 cP) or less. When the viscosity of the phosphazene derivative exceeds 300 mPa·s (300 cP), a supporting salt cannot be easily dissolved in the non-aqueous electrolyte, wettability with respect to anode materials, separators or the like deteriorates, and ionic conductivity noticeably deteriorates by the increase of viscosity resistance of the non-aqueous electrolyte, and the cell becomes unusable especially at a low temperature, such as a freezing point of the electrolyte or lower.

In the non-aqueous electrolyte secondary cell according to another aspect of the present invention, the electrolyte also contains an aprotic organic solvent, and the viscosity of the phosphazene derivatives at 25° C. must be 500 mPa·s (500 cP) or less, and preferably 300 mPa·s (300 cP) or less. When the non-aqueous electrolyte containing the aprotic organic solvent is used, the viscosity of the non-aqueous electrolyte can be lowered. When the viscosity of the phosphazene derivative exceeds 500 mPa·s (500 cP), even after the aprotic organic solvent is mixed with the electrolyte, the viscosity of the non-aqueous electrolyte is still high, thereby making it difficult to accomplish optimum ionic conductivity for the non-aqueous electrolyte secondary cell.

In the non-aqueous electrolyte containing the phosphazene derivative whose viscosity at 25° C. is 300 mPa·s (300 cP) or less, an upper limit of the phosphazene derivative is not particularly defined, and the phosphazene derivative can be solely used as an electrolyte solvent. In the non-aqueous electrolyte containing the phosphazene derivative whose viscosity at 25° C. is 500 mPa·s (500 cP) or less, it is preferable that the content of the phosphazene derivative is 90 vol % or less.

In the latter non-aqueous electrolyte, when the content exceeds 90 vol %, a similar result can be obtained to that obtained when the phosphazene derivative is used alone. Accordingly, the viscosity of the non-aqueous electrolyte becomes higher. Particularly when the viscosity of the phosphazene derivative at 25° C. exceeds 300 mPa·s (300 cP), it becomes difficult to obtain appropriate lithium ionic conductivity for discharging a large amount of current (hereinafter, a large current), and the cell becomes shy of performance when used at low temperature equal to or less than a freezing point.

The phosphazene derivative is contained in both non-aqueous electrolytes of the present invention for the reasons described below.

In the case of short circuit or the like, it has been known that, when a large current rapidly flows into the conventional non-aqueous electrolyte secondary cell containing therein the non-aqueous electrolyte using the aprotic organic solvent, since the cell generates an extreme amount of heat, the electrolyte vaporizes, decomposes, and generates gas, due to the generated gas and heat, the risk of the cell exploding or igniting greatly increases.

The phosphazene derivative, by being contained in the conventional non-aqueous electrolyte, can suppress vaporization, decomposition or the like of the non-aqueous electrolyte at relatively low temperature of 200° C. or less, and reduce a possibility of causing a risk of explosion and ignition. Further, if the cell ignites inside the cell by the cathode materials melting, for example, since the phosphazene derivative is fire-resistant, a possibility of causing exposure is low. Further, phosphor contained in the phosphazene derivative suppresses chain decomposition of high polymer materials for constituting a cell, whereby a possibility of causing a risk of firing and ignition can effectively be reduced.

Therefore, use of the phosphazene derivative makes it possible to provide a non-aqueous electrolyte secondary cell that is more excellent in safety than the conventional non-aqueous electrolyte secondary cell. Besides, the use of the phosphazene derivative makes it possible to provide a non-aqueous electrolyte secondary cell having excellent cell performance such as high voltage, high discharging capacity or ability of discharging a large current.

In the present invention, evaluation of risk of causing ignition and ignition was conducted as "Evaluation of Safety" by short-circuit externally by bonding an anode and a cathode by leads in the non-aqueous electrolyte secondary cell, and by observing five cells for variation of appearances and existence of explosion and ignition.

When the non-aqueous electrolyte includes the organic solvent other than the phosphazene derivative, as a volume percentage of the phosphazene derivative, it is preferable to use two volume percentages comprising a first volume percentage which can provide sufficient self-extinguishing property and a second volume percentage which can provide sufficient flame retardancy.

The first volume percentage of the phosphazene derivative is preferably 20 to 50 vol %, and more preferably 40 to 50 vol %. The second volume percentage of the phosphazene derivative is preferably 30 to 50 vol %, and more preferably 40 to 50 vol %.

If the non-aqueous electrolyte contains $LiPF_6$ as the supporting salts, and ethylene carbonate (EC) as the cyclic carbonic ester, even when the content of the phosphazene derivative in the non-aqueous electrolyte is small, a possibility of causing the non-aqueous electrolyte to be in risk of ignition or ignition is largely reduced. Namely, in such a case, the first volume percentage of the phosphazene derivative is preferably 1.5 to 2.5 vol %. The second volume percentage of the phosphazene derivative is preferably 2.5 to 50 vol %, and more preferably 3 to 50 vol %.

When the volume percentage of the phosphazene derivative is less than 20 vol % (1.5 vol % when the electrolyte includes $LiPF_6$ and/or EC, or 10 vol % when the phosphazene derivative has a halogen element in its molecule structure), it is not preferable because the non-aqueous electrolyte cannot exhibit self-extinguishing property or flame retardancy sufficiently. Further, when the volume percentage of the phosphazene derivative exceeds 50 vol %, it is not preferable because the viscosity of the non-aqueous electrolyte increases thus making it impossible to maintain excellent conductivity.

In an evaluation method of "self-extinguishing property" described below, the self-extinguishing property means characteristics in which ignited flame extinguishes at a height of 25 to 100 mm with no ignition of fallen residues found. Further, in an evaluation method of "flame retardancy" described below, the flame retardancy means characteristics that the ignited flame does not extend to a height of 25 mm with no ignition of fallen residues found.

As for self-extinguishing property and flame retardancy, combustion behavior of flame ignited under atmospheric environment can be measured and evaluated by using a method in which a UL94HB method according to UL (under-lighting laboratory) standards is modified, At that time, ignitability, flammability, formation of carbide, and phenomenon during a secondary ignition are observed. More specifically, these observations can be done by immersing inflammable quarz fibers in various electrolytes (1 ml), and by preparing test pieces (127 mm×12.7 mm), on the basis of UL test standards.

It is preferable to use a phosphazene derivative having a substituent containing a halogen element in its molecular structure.

If the phosphazene derivative contains the substituent containing a halogen element in its molecular structure, due to a halogen gas induced from the phosphazene derivative, effects of providing self-extinguishing property or flame retardancy can effectively be exhibited. Accordingly, with a small amount of the phosphazene derivative to be added to the electrolyte, similar effects to those of the above-description can be obtained.

In a case in which the phosphazene derivative has a substituent containing therein a halogen element in the molecular structure, the first volume percentage of the phosphazene derivative is preferably 10 to 50 vol %, and more preferably 20 to 50 vol %. Further, the second volume percentage of the phosphazene derivative is preferably 20 to 50 vol %, and more preferably 30 to 50 vol %.

In compounds containing a halogen element in a substituent thereof, formation of halogen radicals sometimes causes a problem. However, in the phosphazene derivative according to the present invention, such a problem is not caused because a phosphorous element in the molecular structure catches a halogen radical, and forms stable halogenated phosphorous.

A content of the halogen element in the phosphazene derivative is preferably 2 to 80 wt %, and more preferably 2 to 60 wt %, and most preferably 2 to 50 wt %.

When the content is less than 2 wt %, a noticeable effect in which the halogen element is contained in the substituent of the phosphazene derivative cannot be obtained. Meanwhile, when the content exceeds 80 wt %, the viscosity of the phosphazene derivative increases, whereby conductivity of the non-aqueous electrolyte including such a phosphazene derivative may deteriorate.

As the halogen elements, fluorine, chlorine, and bromine are preferable, and fluorine is more preferable.

A flash point of the phosphazene derivative is not particularly limited, but from the viewpoint of inhibiting ignition or the like, the flash point is preferably 100° C. or more, and more preferably 150° C. or more.

The phosphazene derivative is not particularly specified as long as it is liquid at ordinary temperature (20° C). However, suitable examples include chain phosphazene derivatives represented by the following formula (1), or cyclic phosphazene derivatives represented by the following formula (2).

Formula (1):

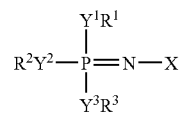

However, in formula (1), $R^1$, $R^2$ and $R^3$ independently represent a monovalent substituent or a halogen element. X represents an organic group containing at least one element selected from a group of carbon, silicon, germanium, tin, nitrogen, phosphorus, arsenic, antimony, bismuth, oxygen, sulfur, selenium, tellurium and polonium. $Y_1$, $Y^2$ and Y3 independently represent a divalent connecting group, a divalent element or a single bond.

Formula (2)

$$(PNR^4{}_2)_n \qquad (2)$$

In formula (2), $R^4$ represents a monovalent substituent, or a halogen element; and n represents from 3 to 15.

In formula (1), $R^1$, $R^2$ and $R^3$ are not particularly limited as long as $R^1$, $R^2$ and $R^3$ independently represent a monovalent substituent or a halogen element. Examples of monovalent substituents include an alkoxy group, an alkyl group, a carboxyl group, an acyl group and an aryl group. As the halogen elements, the halogen elements described above are suitably used. Among these, the alkoxy group is preferable from the viewpoint of lowering the viscosity of the non-aqueous electrolyte. $R^1$, $R^2$ and $R^3$ may have substituents that are the same or different.

Examples of the alkoxy groups include: a methoxy group, an ethoxy group, a propoxy group and a butoxy group; or alkoxy groups substituted by alkoxy groups such as a methoxyethoxy group and a methoxyethoxyethoxy group. Among these, it is preferable that $R^1$, $R^2$ and $R^3$ entirely and respectively comprise a methoxy group, an ethoxy group, a methoxyethoxy group, or a methoxyethoxyethoxy group. From the viewpoint of lowering viscosity and obtaining high dielectric constant, it is particularly preferable that $R^1$ to $R^3$ are methoxy groups or ethoxy groups.

Examples of the alkyl groups include a methyl group, an ethyl group, a propyl group, a butyl group, and a pentyl group.

Examples of the acyl group include a formyl group, an acetyl group, a propionyl group, a butyryl group, an isobutyryl group, and a valeryl group.

Examples of the aryl group include a phenyl group, a tolyl group, and a naphthyl group.

Hydrogen elements in these substituents are preferably substituted by the halogen elements as described above.

In formula (1), examples of groups represented by $Y_1$, $Y^2$ and $Y^3$ include, other than a $CH_2$ group, groups containing an element such as oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among these, the $CH_2$ group, and groups containing an element such as oxygen, sulfur, selenium and nitrogen are preferable. It is preferable that $Y_1$, $Y^2$ and $Y^3$ respectively contain an element such as sulfur or selenium because flame retardancy of non-aqueous electrolytes noticeably improves. $Y^1$ to $Y^3$ can be the same or different.

In formula (1), X is preferably an organic group containing at least one element selected from a group of carbon, silicon, nitrogen, phosphorus, oxygen and sulfur in consideration of harmfulness and influence on environment, and more preferably an organic group having structures represented by formula (3) described below:

Formula (3):

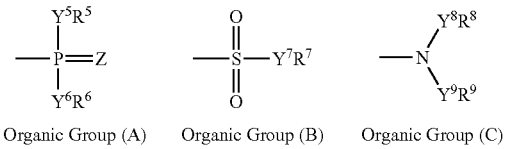

Organic Group (A)   Organic Group (B)   Organic Group (C)

However, in formula (3), $R^5$ to $R^9$ independently represent a monovalent substituent or a halogen element. $Y^5$ to $Y^9$ independently represent a divalent connecting group, a divalent element or a single bond, and Z represents a divalent group or a divalent element.

In formula (3), $R^5$ to $R^9$ can be arbitrary monovalent substituents or halogen elements in the description about $R^1$ to $R^3$ in formula (1). $R^5$ to $R^9$ can be the same in the same organic group, or can be different. $R^5$ and $R^6$, and $R^8$ and $R^9$ may bond to each other to form a ring.

In formula (3), examples of groups represented by $Y^5$ to $Y^9$ can include the same divalent connecting groups or divalent groups as those described in $Y_1$ to $Y^3$ of formula (1). Similarly, it is particularly preferable that the groups represented by $Y^5$ to $Y^9$ contain an element such as sulfur and selenium because flame retardancy of the non-aqueous electrolyte noticeably improves. These groups can be the same or different in the same organic group.

In formula (3), besides $CH_2$ group, CHR group (in which R represents an alkyl group, an alkoxyl group or a phenyl group, and hereinafter, the same), and NR group, examples of Z include: groups containing an element such as oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among these, $CH_2$ group, CHR group, NR group, and groups including an element such as oxygen, sulfur or selenium are preferable. It is particularly preferable that Z contains an element such as sulfur or selenium because flame retardancy of the non-aqueous electrolyte noticeably improves.

In formula (3), an organic group containing phosphorous as represented by the organic group (A) is particularly preferable in respects that self-extinguishing property or flame retardancy can be provided effectively. Further, an organic group containing sulfur as represented by the organic group (B) is particularly preferable in respects that a resistance between interfaces of non-aqueous electrolytes is reduced.

In formula (2), $R^4$ is not particularly limited provided that $R^4$ is a monovalent substituent or a halogen element. Examples of the monovalent substituent include: an alkoxy group, an alkyl group, a carboxyl group, an acyl group and an aryl group. As the halogen elements, the above-described examples of the halogen elements are preferable. Among these, the alkoxy group is particularly preferable in respects that viscosity of the non-aqueous electrolyte can be reduced.

Examples of the alkoxy groups include: a methoxy group, an ethoxy group, a methoxyethoxy group, a propoxy group, a phenoxy group, and the like. Among these, the methoxy group, the ethoxy group, and the methoxyethoxy group are particularly preferable.

It is preferable that the hydrogen elements in these substituents are substituted by the halogen elements as described above.

By appropriately selecting $R^1$ to $R^9$, $Y^1$ to $Y^3$, $Y^5$ to $Y^9$, and Z of formulae (1) to (3), synthesis of additives for a non-aqueous electrolyte having more preferable viscosity, solubility appropriate for addition and mixture, and the like is made possible. These phosphazene derivatives can be used alone or two or more thereof can be used in combination.

[Other Members]

As another member, a separator which is interposed between anode and cathode in the non-aqueous electrolyte secondary cell is used in order to prevent currents from short-circuit by the anode and cathode contacting with one another.

-Separator-

Any separators can be used as long as they have insulatability for preventing currents from short-circuit by both electrodes contacting with one another, hold a non-aqueous electrolyte, has a function capable of transmitting lithium ions therethrough, and resistance with respect to the non-aqueous electrolyte to be used or resistance with respect to electrochemical reaction at anode or cathode. Examples of the separators include: nonwoven fabrics, woven fabrics, and thin films formed by synthetic resins such as fluororesins (such as polytetrafluoroethylene), olefin resins (such as polyethylene and polypropylene), and nylons. Among these, micro-porous films made by polyethylene or polypropylene are particularly preferable.

The thinner the thickness of a separator, the better, in that volume energy density as a cell can be increased, internal resistance is made smaller, so long as a mechanical strength thereof can be kept. The thickness of the separator is preferably about 10 to 200 μm, and more preferable 20 to 50 μm.

Configuration of the non-aqueous secondary electrolyte of the present invention is not particularly limited, and can preferably be formed into various known configurations such as coin, button, paper, square, and cylindrical cells, the cylindrical cell having a spiral structure. In the case of the spiral structure, a non-aqueous electrolyte secondary cell is manufactured such that sheet-type anodes are prepared, a collector is interposed therebetween, cathodes (sheet type) are superimposed thereon, and then wound up. Further, besides the aforementioned anodes, cathodes, non-aqueous electrolytes, and separators, each of known members that are ordinarily used for cells can be applied.

In the above-described non-aqueous electrolyte secondary cell of the present invention, by using the non-aqueous electrolytes described above, the non-aqueous electrolyte secondary cell becomes excellent in self-extinguishing property or flame retardancy, and is able to have highly safety. Further, even when high crystalline carbon materials such as graphite are used as active substances for a cathode, use of the above-described non-aqueous electrolytes allows the non-aqueous electrolyte secondary cell to maintain charging/discharging efficiency at room temperature, large current discharging characteristics, and cycle characteristics, and to thereby provide the non-aqueous electrolyte secondary cell with low interface resistance of the non-aqueous electrolyte and excellent discharging characteristics at low temperature.

EXAMPLES

With reference to Examples and Comparative Examples, more detailed descriptions of the present invention will be given hereinafter. The present invention is not limited by the Examples described below:

Example 1

<Non-aqueous Electrolyte Secondary Cell>
Preparation of Non-aqueous Electrolyte $LiBF_4$ (lithium salt) at concentration of 0.5 mol/kg was dissolved in 50 ml of a phosphazene derivative (chain EO phosphazene derivative (a compound represented by formula (1) in which X has a structure of an organic group (A) represented by formula (3), $Y^1$ to $Y^3$ and $Y^5$ to $Y^6$ are all single bonds, $R^1$ to $R^3$ and $R^5$ to $R^6$ represent an ethoxy group, and Z represents oxygen); a ignition point: 155° C.; and viscosity at 25° C.: 5.8 mPa·s (cP)) to thereby prepare a non-aqueous electrolyte.

Preparation of a Non-aqueous Electrolyte Secondary Cell

A cobalt oxide represented by chemical formula $LiCoO_2$ was used as active substances for an anode. Then, 10 parts of acetylene black (conductive assistant) and 10 parts of teflon binder (binder resin) were added to 100 parts of $LiCoO_2$. This was kneaded with an organic solvent (a solvent in which ethyl acetate and ethanol were mixed in a ratio of 50 to 50 vol %). Thereafter, this was press-rolled to thereby prepare a thin anode sheet (thickness: 100 μm and width: 40 mm).

Thereafter, the two anode sheets obtained were used to sandwich therebetween an aluminum foil (collector) whose thickness is 25 μm and in which a conductive adhesive was coated on the surface thereof. A separator whose thickness is 25 μm (a micro-porous polypropylene film) was placed on the anode sheets. A lithuium metal foil whose thickness is 150 was superimposed on this, and rolled up to thereby prepare a cylindrical electrode having an anode length of about 260 mm.

The non-aqueous electrolyte was poured into the cylindrical electrode, and sealed to thereby prepare a size AA lithium cell.

<Measurement and Evaluation of Cell Properties>

After initial properties (such as voltage and internal resistance) of the cell obtained were measured and evaluated at 20° C., charging/discharging cycle performance and discharging characteristics at low temperature were measured and evaluated by a method of evaluation described below. The results are shown in table 1.

Evaluation of Charging/Discharging Cycle Performance

Charging/discharging was repeated to 50 cycles, providing that a maximum voltage was 4.5 V, a minimum voltage was 3.0 V, a discharging current was 100 mA, and a charging current was 50 mA. A charging/discharging capacity at this time was compared with that at the initial stage of charging/discharging, and a capacity reduction ratio after charging/discharging was repeated 50 times was calculated. Similarly, total three cells were measured and calculated to determine a mean value to thereby evaluate discharging characteristics at low temperature.

Evaluation of Discharging Characteristics at Low Temperature (Measurement of Discharging Capacity at Low Temperature)

Charging/discharging of the obtained cells was repeated to 50 cycles under the same conditions as the aforementioned "Evaluation of charging/discharging characteristics" except that discharging was conducted at low temperature (such as −10° C., and −20° C.). A discharging capacity at such low temperature at this time was compared with that measured at 20° C. to thereby calculate a discharging capacity reduction ratio by using the equation below. Similarly, the discharging capacity reduction ratio were measured and calculated with respect to total three cells, whereby a mean value was determined to evaluate discharging characteristics at low temperature. The results are shown in table 1.

Equation: Discharging capacity reduction ratio=100−(discharging capacity at low temperature/discharging capacity (20° C.))×100(%)

<Evaluation of Safety>

The cells obtained were charged/discharged at five cycles, and charged to become 3.0 V. Thereafter, the anode and cathode were bonded by lead and externally shortened, whereby change of cell appearance and with/without of explosion and ignition were observed visually and evaluated. The results are shown in table 1.

Example 2

Except that the amount of phosphazene derivative (chain EO phosphazene derivative (a compound in formula (1) in which X has a structure of an organic group (A) represented by formula (3), $Y_1$ to $Y^3$ and $Y^5$ to $Y^6$ are all single bonds, and $R^1$ to $R^3$ and $R^5$ to $R^6$ represent an ethoxy group) was changed to 40 ml, and a solvent in which diethyl carbonate and ethylene carbonate were mixed (mixture ratio (volume ratio) of diethyl carbonate/ethylene carbonate=⅓) (which is an aprotic organic solvent whose viscosity at 25° C. is 1.8 mPa·s (cP)) (10 ml) was added to phosphazene derivative in the "Preparation of non-aqueous electrolyte" in Example 1, a non-aqueous electrolyte was prepared in the same manner as in Example 1, a non-aqueous electrolyte secondary cell was made, and initial cell characteristics (such as voltages and internal resistances), charging/discharging cycle characteristics, discharging characteristics at low temperature and safety were respectively measured and evaluated. The results are shown in table 1.

Comparative Example 1

Except that the phosphazene derivative (chain EO phosphazene derivative (a compound in formula (1) in which X has a structure of an organic group (A) represented by formula (3), $Y^1$ to $Y^3$ and $Y^5$ to $Y^6$ are all single bonds, and $R^1$ to $R^3$ and $R^5$ to $R^6$ represent an ethoxy group) in the "Preparation of non-aqueous electrolyte" in Example 1 was replaced by a phosphazene derivative (a compound which is represented by formula (2) in which $R^4$ is —$OCH_2CF_2CF_2CF_2CF_3$ group, n represents from 3 to 5, and whose viscosity at 25° C. is 400 mPa·s (400 cP)) in the "preparation of the non-aqueous electrolyte" in Example 1, a non-aqueous electrolyte was prepared in the same manner as that in Example 1, a non-aqueous electrolyte secondary cell was made, and initial cell characteristics (such as voltages and internal resistances), charging/discharging cycle characteristics, discharging characteristics at low temperature and safety were respectively measured and evaluated. The results are shown in table 1.

Comparative Example 2

Except that the phosphazene derivative (chain EO phosphazene derivative (a compound in formula (1) in which X has a structure of an organic group (A) represented by formula (3), $Y_1$ to $Y^3$ and $Y^5$ to $Y^6$ are all single bonds, and $R^1$ to $R^3$ and $R^5$ to $R^6$ independently represents an ethoxy group) in the "Preparation of non-aqueous electrolyte" in Example 2 was not used, and instead, a solvent in which diethyl carbonate and ethylene carbonate were mixed (mixture ratio (volume ratio) of diethyl carbonate/ethylene carbonate=1/1) was added in an amount of 50 ml, a non-aqueous electrolyte was prepared in the same manner as that in Example 2, initial cell characteristics (such as voltages and internal resistances), charging/discharging cycle characteristics, discharging characteristics at low temperature, and safety were respectively measured and evaluated. The results are shown in table 1.

slurry. After this was coated on a copper foil, dried and pressed, thus-obtained sheet type electrode was cut into a size whose diameter is 20 mm and the resultant cut electrode was used.

Separator

As a separator, a polypropylene porous film ("Selguard #3500" manufactured by Hoechst Celanse Inc.) was used.

Preparation of a Non-aqueous Electrolyte

A mixed organic solvent was prepared according to compositions shown in table 2. A supporting salt shown in table 2 was added to this, whereby a non-aqueous electrolyte was prepared and used. As a phosphazene derivative (Pz), a chain EO phosphazene derivative (a compound in formula (1) in which X has a structure of an organic group (A) represented by formula (3), $Y_1$ to $Y^3$ and $Y^5$ to $Y^6$ are all single bonds, $R^1$ to $R^3$ and $R^5$ to $R^6$ represent an ethoxy group, and Z is an oxygen) was used.

TABLE 1

| | Viscosity (mPa·s) of phosphazene derivative | Voltage (V) | Internal resistance (mΩ) | Capacity reduction rate after 50 cycles (%) | Ignition point of phosphazene derivative (° C.) | Evaluation of discharging characteristics at low temperature (discharging capacity reduction rate after 50 cycles) | | Safety |
|---|---|---|---|---|---|---|---|---|
| | | | | | | Temperature during discharging: −10° C. | Temperature during discharging: −20° C. | |
| Example 1 | 5.8 | 2.9 | 150 | 8 | 155 (° C.) | 40% or less | 70% or less | normal |
| Example 2 | 4.8 | 2.85 | 215 | 5 | 155 (° C.) | 40% or less | 70% or less | normal |
| Comp. Example 1 | 400.0 | 3.26 | 400 | 15 | 351 (° C.) | 50% or more | 90% or more | Normal |
| Comp. Example 2 | — | 2.8 | 190 | 4 | — | 50% or more | 85% or more | Explosion |

Example 3

<Non-aqueous Electrolyte Secondary Cell>

Preparation of Anodes

Anodes were prepared such that lithium nitrate and nickel carbonate were mixed, and calcined in an air flow of oxygen for 15 hours at 700° C. to thereby obtain lithium nickel oxide powders. Powders in which the nickel oxide lithium powders, artificial graphite and polyvinylidene fluoride (manufactured by Kureha Chemical Industry Co., Ltd.) were mixed in a weight ratio of 87:10:3 were dispersed in a 2-methylpyrolidone solution to prepare slurry. After this was coated on an aluminum foil and was vacuum dried, and pressed, thus-obtained sheet type electrode was cut into a size of 1.5 cm×2.0 cm and the resultant cut electrode was used. When an X-ray diffraction measurement was conducted on the nickel lithium powders, it was confirmed that the nickel lithium powders contained α-$NaFeO_2$ type structure.

A cathode was prepared such that powders in which squama-like natural graphite powders that were produced in Madagascal and were heat-treated at 3000° C. and carbon black (manufactured by Tokai Carbon Co., Ltd.) that were heat-treated at the temperature of 3800° C. and polyvinylidene fluoride (manufactured by Kureha Chemical Industry Co., Ltd.) were mixed in a weight ratio of 86:4:10 were dispersed in a 2-methylpyrolydone solution to prepare Preparation of a Non-aqueous Electrolyte Secondary Cell An anode and cathode were placed so as to face each other through the separator, and was contained in a stainless vessel with the non-aqueous electrolyte to thereby prepare cells A-1 to A-13.

<Evaluation>

With respect to each of the cells obtained, a discharging capacity holding rate (discharging at ordinary temperature, discharging at low temperature, a cycle discharging, and discharging of a large current), self-extinguishing property, and flame retardancy were observed. The results are shown in table 2.

Discharging Capacity Holding Rate

A discharging capacity holding rate was measured for each cell at the time of discharging at ordinary temperature, discharging at low temperature, a cycle discharging, or discharging of a large current. Further, a constant current/a constant voltage charging was always conducted at 20° C., at a maximum charging voltage $V_{max}$=4.1 V, at a constant current of 6 mA, and for three hours.

Discharging at Ordinary Temperature:

A discharging test was conducted at 25° C. and 20° C., at a cut-off voltage of 2.75V, and at a constant current of 1.2 mA. A ratio of a discharging capacity at 20° C. to that at 25° C. ((discharging capacity at 20° C. discharging capacity at 25° C.×100) was shown as a discharging capacity holding rate during charging at ordinary temperature. Moreover, these discharging capacities corresponds to discharging conditions at 0.2 C.

Discharging at Low Temperature:

A discharging test was conducted at 20° C. and −10° C., at a cut-off voltage of 2.75 V, and at a constant current of 1.2 mA. A ratio of a discharging capacity at −10° C. with respect to that at 20° C. ((discharging capacity at −10° C./discharging capacity at 20° C.×100) was shown as a discharging capacity holding rate during a discharging at low temperature. Moreover, these discharging capacities correspond to discharging conditions at 0.2 C.

Cycle Discharging:

After a cell was charged and paused for 0.5 hour, a discharging test of the cell was conducted at room temperature (25° C.), at a cut-off voltage of 2.75 V, and at a constant current of 1.2 mA, and the cell was paused again for 0.5 hour. This corresponds to 1 C charging and 0.2 C discharging. This charging/discharging cycle was repeated for 20 times. A ratio of a twentieth discharging capacity to a first discharging capacity ((a twentieth discharging capacity/a first discharging capacity))×100) was shown as a discharging capacity holding rate during a cycle discharge.

Large Current Discharging:

A discharging test was conducted at a cut-off voltage of 2.75 V and at a constant current of 1.2 mA, and at a cut-off voltage of 2.75 V and at a constant current of 6 mA. A ratio of a discharging capacity at a constant current of 1.2 mA with respect to a discharging capacity at a constant current of 6 mA ((discharging capacity at a constant current of 6 mA/discharging capacity at a constant current of 1.2 mA) was shown as a discharging capacity holding rate during a large current discharging. Moreover, this discharging capacity at a cut-off voltage 2.75 V and at a constant current of 6 mA corresponds to a discharging condition at 1 C.

Test for Self-extinguishing Property and Flame Retardancy

According to the above-description, tests and evaluations were carried out by using only non-aqueous electrolytes as described below.

A case in which ignited flame did not reach a height of 25 mm in a device, and things dropped from a net were not ignited was evaluated to have flame retardancy.

A case in which ignited flame was extinguished between the heights of 25 mm and 100 mm, and things dropped from a net were not ignited was evaluated to have self-extinguishing property.

A case in which ignited flame exceeded a height of 100 mm was evaluated to have combustibility.

Comparative Example 3

Cells B-1 to B-5 were prepared and evaluated in the same manner as in Example 3 except that a mixed organic solvent was prepared according to the compositions shown in table 2, and a non aqueous electrolyte to which a supporting salt shown in table 2 was added was used. The results are shown in table 2. In table 2, "-" indicates that tests could not be done because the non-aqueous electrolyte was frozen.

TABLE 2

| | Non-aqueous electrolyte | | | | | Discharging capacity holding ratio | | | | Test for self |
|---|---|---|---|---|---|---|---|---|---|---|
| | Composition of organic solvent (vol %) | | | | Supporting Salt (mol/l) | Discharging at ordinary | Discharging at low | Cycle | Large current | extinguishing property/flame |
| | EC | DEC | EMC | Pz | LiPF$_6$ | temperature | temperature | discharge | discharge | retardancy |
| Example 3 | | | | | | | | | | |
| A-1 | 60 | 30 | 8.5 | 1.5 | 0.75 | >98 | >60 | >95 | 92 | self extinguishing property |
| A-2 | 50 | 42 | 5.0 | 3 | 0.75 | >98 | >60 | >95 | 92 | flame retardancy |
| A-3 | 50 | 40 | 5 | 5 | 0.75 | >98 | >60 | >93 | 90 | flame retardancy |
| A-4 | 40 | 25 | 25 | 10 | 0.75 | >98 | >60 | >93 | 89 | flame retardancy |
| A-5 | 40 | 25 | 20 | 15 | 0.75 | >98 | >65 | >90 | 85 | flame retardancy |
| A-6 | 30 | 25 | 20 | 25 | 0.75 | >95 | >65 | >90 | 85 | flame retardancy |
| A-7 | 15 | 5 | 30 | 50 | 0.75 | >93 | >65 | >90 | 80 | flame retardancy |
| A-8 | 60 | 30 | 8.5 | 1.5 | 0.5 | >98 | >60 | >90 | 90 | flame retardancy |
| A-9 | 60 | 30 | 8.5 | 1.5 | 1.0 | >98 | >60 | >93 | 90 | flame retardancy |
| A-10 | 40 | 50 | 7 | 3 | 0.5 | >98 | >65 | >93 | 88 | flame retardancy |
| A-11 | 60 | 7 | 30 | 3 | 1.0 | >95 | >60 | >95 | 92 | flame retardancy |
| A-12 | 50 | 15 | 30 | 5 | 0.5 | >98 | >60 | >92 | 90 | flame retardancy |
| A-13 | 60 | 5 | 25 | 10 | 0.5 | >95 | >60 | >92 | 89 | flame retardancy |
| Comp. Example 3 | | | | | | | | | | |
| B-1 | 15 | 12.5 | 12.5 | 60 | 0.75 | >85 | <40 | <65 | <60 | flame retardancy |
| B-2 | 65 | 10 | 5 | 20 | 0.75 | >95 | <40 | >90 | 89 | flame retardancy |
| B-3 | 15 | 45 | 35 | 5 | 0.75 | >95 | >60 | >93 | 90 | combustibility |
| B-4 | 15 | 55 | 25 | 5 | 0.75 | >95 | >60 | >94 | 92 | combustibility |
| B-5 | 70 | 20 | 8.5 | 1.5 | 0.75 | >90 | — | 85 | 180 | flame retardancy |

Example 4

Cells C-1 to C-4 were prepared and evaluated in the same manner as in Example 3 except that a mixed organic solvent was prepared according to the compositions shown in table 3, and a non aqueous electrolyte to which a supporting salt shown in table 3 was added was used. With reference to the cells C-1 to C-4, a discharging test at a cut-off voltage of 2.75 V and a constant current of 1.2 mA was conducted at temperatures 25° C. and −20° C. to 80° C. (−20° C., 0° C., 20° C., 40° C., 60° C., and 80° C.). A ratio of a discharging capacity at respective temperatures (−20 C., 0° C., 20° C., 40° C., 60° C., and 80° C.) to a discharging capacity at 25° C. ((Discharging capacity at each temperature/Discharging capacity at 25° C.)×100) was shown as a "discharging capacity holding ratio" at each temperature. Further, these discharging capacities correspond to discharging conditions at 0.2 C. The results are shown in table 3.

Example 5

<Non-aqueous Electrolyte Secondary Cell>

Anode, Cathode, and Separator

An anode and cathode prepared in the same manner as in Example 3 were used. The same separator as that in Example 3 was used.

Preparation of a Non-aqueous Electrolyte

A non-aqueous electrolyte was prepared in the same manner as in Example 3 except that a mixed organic solvent was prepared according to compositions shown in table 4, and a non-aqueous electrolyte in which a supporting salt shown in table 4 was added to the organic solvent was used.

Preparation of a Non-aqueous Electrolyte Secondary Cell

Cells D-1 to D-10 were prepared in the same manner as in Example 3.

TABLE 3

| | Non-aqueous electrolyte | | | | | | | | | | |
|---|---|---|---|---|---|---|---|---|---|---|---|
| | Organic solvent composition (vol %) | | | | Supporting salt (mol/l) | Discharging capacity holding ratio | | | | | |
| | EC | DMC | EMC | Pz | $LiPF_6$ | −20° C. | 0° C. | 20° C. | 40° C. | 60° C. | 80° C. |
| Example 4 | | | | | | | | | | | |
| C-1 | 20 | 40 | 30 | 10 | 0.75 | 40 | 93 | 98 | 96 | 94 | 90 |
| C-2 | 40 | 30 | 20 | 10 | 0.75 | 30 | 90 | 98 | 95 | 94 | 90 |
| C-3 | 30 | 50 | 10 | 10 | 0.75 | 30 | 92 | 97 | 96 | 93 | 89 |
| C-4 | 30 | 35 | 32 | 3 | 0.75 | 35 | 93 | 98 | 96 | 93 | 88 |

From tables 2 and 3, it can be noted that, even when graphite carbon materials were used as active substances for a cathode, use of the above-described non-aqueous electrolytes allows the non-aqueous electrolyte secondary cell to maintain large discharging capacity at low temperature of −20° C. and to prevent discharging capacity from deteriorating noticeably during the discharge of a large current of 1 C or more, without damaging characteristics such as charging/discharging effects at room temperature, large energy densities, or cycle characteristics. Further, since the non-aqueous electrolyte secondary cell can operate even at high temperature of 80° C., and has flame retardancy and self-extinguishing property, industrial values as portable electronic devices used for outdoors or transport devices for electric vehicles are highly developed.

<Evaluations>

The cells obtained were observed in the same manner as in Example 3, and evaluated. The results are shown in table 4.

Comparative Example 4

Cells E-1 to E-4 were prepared and evaluated in the same manner as in Example 3 except that a mixed organic solvent was prepared according to the compositions shown in table 4, and a non aqueous electrolyte to which a supporting salt shown in table 4 was added was used. The results are shown in table 4. In table 4, "-" indicates that a test could not be conducted due to freezing of the non-aqueous electrolyte.

TABLE 4

| | Non-aqueous electrolyte | | | | Discharging capacity holding ratio | | | | Test for self extinguishing property/flame retardancy |
|---|---|---|---|---|---|---|---|---|---|
| | Composition of organic solvent (vol %) | | | Supporting Salt (mol/l) | Discharging at ordinary temperature | Discharging at low temperature | Cycle discharge | Large current discharge | |
| | EC | DEC | Pz | $LiPF_6$ | | | | | |
| Example 5 | | | | | | | | | |
| D-1 | 60 | 38.5 | 1.5 | 0.75 | 95 | >60 | 93 | 90 | self extinguishing property |
| D-2 | 50 | 47 | 3 | 0.75 | 93 | >60 | 93 | 90 | flame retardancy |
| D-3 | 50 | 45 | 5 | 0.75 | 95 | >60 | 93 | 91 | flame retardancy |
| D-4 | 40 | 50 | 10 | 0.75 | 95 | >60 | 95 | 92 | flame retardancy |
| D-5 | 40 | 45 | 15 | 0.75 | 93 | >65 | 90 | 89 | flame retardancy |

TABLE 4-continued

| | Non-aqueous electrolyte | | | | Discharging capacity holding ratio | | | | Test for self |
|---|---|---|---|---|---|---|---|---|---|
| | Composition | | | | | | | | |
| | of organic solvent (vol %) | | | Supporting Salt (mol/l) | Discharging at ordinary | Discharging at low | Cycle | Large current | extinguishing property/flame |
| | EC | DEC | Pz | LiPF$_6$ | temperature | temperature | discharge | discharge | retardancy |
| D-6 | 30 | 45 | 25 | 0.75 | 95 | >65 | 90 | 88 | flame retardancy |
| D-7 | 15 | 35 | 50 | 0.75 | 98 | >65 | 92 | 88 | flame retardancy |
| D-8 | 60 | 38.5 | 1.5 | 0.5 | 95 | >60 | 93 | 89 | flame retardancy |
| D-9 | 60 | 38.5 | 1.5 | 1.0 | 93 | >60 | 90 | 89 | flame retardancy |
| D-10 | 40 | 50 | 10 | 0.5 | 98 | >65 | 92 | 93 | flame retardancy |
| Comp. Example 4 | | | | | | | | | |
| E-1 | 15 | 25 | 60 | 0.75 | 85 | 40 | 65 | 60 or less | flame retardancy |
| E-2 | 65 | 15 | 20 | 0.75 | 95 | 40 | 90 | 88 | flame retardancy |
| E-3 | 15 | 80 | 5 | 0.75 | 95 | 62 | 93 | 89 | combustibility |
| E-4 | 70 | 20 | 10 | 0.75 | 95 | 63 | 93 | 85 | combustibility |

Example 6

Cells F-1 to F-4 were prepared and evaluated in the same manner as in Example 3 except that a mixed organic solvent was prepared according to the compositions shown in table 5, and a non-aqueous electrolyte to which a supporting salt shown in table 5 was added was used. With reference to the cells F-1 to F-4, a discharging test at a cut-off voltage of 2.75 V and a constant current of 1.2 mA was conducted at temperatures 25° C. and −20° C. to 80° C. (−20° C., 0° C., 20° C., 40° C., 60° C., and 80° C.). A ratio of a discharging capacity at respective temperatures (−20 C., 0° C., 20° C., 40° C., 60° C., and 80° C.) to a discharging capacity at 25° C. ((Discharging capacity at each temperature/Discharging capacity at 25° C.)×100) was shown as a "discharging capacity holding ratio" at each temperature. Further, these discharging capacities correspond to discharging conditions at 0.2 C. The results are shown in table 5.

Further, the non-aqueous electrolyte secondary cell can operate even at high temperature of 80° C., and has flame retardancy and self-extinguishing property, whereby industrial values as portable electronic devices used for outdoors or transport devices for electric vehicles are highly developed.

Example 7

<Non-aqueous Electrolyte Secondary Cell>

<Preparation of Anodes>

An anode prepared in the same manner as in Example 3 was used.

Preparation of Cathode

Carbon powders obtained by spraying air flow onto a massive carbon material (graphite) in which d ($d_{002}$)=3.35 Å and by grinding (jet-grinding) the massive carbon material and a 5 wt. % of NMP (N-methyl-2-pyrolidone) solution containing polyvinylidene fluoride (PVDF) were kneaded at a weight ratio of 95:5, whereby slurry was prepared. The slurry was coated on both sides of copper foil (cathode collector) by a doctor-blade method, and the collector was vacuum-dried for 2 hours at 150° C., thus-obtained sheet

TABLE 5

| | Non-aqueous electrolyte | | | | Discharging capacity holding ratio | | | | | |
|---|---|---|---|---|---|---|---|---|---|---|
| | Organic solvent composition (vol %) | | | Supporting salt (mol/l) | | | | | | |
| | EC | DMC | Pz | LiPF$_6$ | −20° C. | 0° C. | 20° C. | 40° C. | 60° C. | 80° C. |
| Example 6 | | | | | | | | | | |
| F-1 | 20 | 70 | 10 | 0.75 | 40 | 88 | 98 | 96 | 92 | 88 |
| F-2 | 40 | 50 | 10 | 0.75 | 32 | 86 | 97 | 95 | 92 | 84 |
| F-3 | 30 | 60 | 10 | 0.75 | 33 | 90 | 98 | 96 | 90 | 86 |
| F-4 | 30 | 67 | 3 | 0.75 | 35 | 89 | 96 | 94 | 90 | 86 |

From tables 4 and 5, it can be appreciated that use of the above-described non-aqueous electrolyte allows the discharging life of the non-aqueous electrolyte secondary cell to be longer, and the discharging capacity of the cell at low temperature of −20° C. to be maintained large, and prevents noticeable deterioration of the discharging capacity of the cell when a large current at 1 C or more is discharged.

type electrode was cut to a size of 1.5 cm×2 cm and the resultant cut electrode was used.

Separator

Polypropylene porous film (Cellguard No. 2240 manufacture by Daicell Chemical Co., Ltd.) was used as a separator.

Preparation of a Non-aqueous Electrolyte

A mixed organic solvent was prepared according to the compositions shown in table 6, and a non-aqueous electrolyte to which a supporting salt shown in table 6 was added so as to have 1 mol/l was used.

Preparation of a Non-aqueous Electrolyte Secondary Cell

Cells G-1 to G-5 were prepared in the same manner as in Example 3.

<Evaluations>

The cells obtained were respectively observed for a discharging capacity holding ratio (discharging at room temperature), self-extinguishing properties, and flame retardancy in the same manner as in Example 3, and evaluated. A freezing point of the non-aqueous electrolyte was observed as below, and evaluated. The results are shown in table 6.

Freezing Point of a Non-aqueous Electrolyte

A cell was cooled to a temperature of −50° C., and determined if the non-aqueous electrolyte was visually frozen. Regarding to the non-aqueous electrolytes that were not frozen, it was indicated that the freezing point is −50° C. or less. Further, a rheometer was used to confirm that input pressure and output pressure are equal and the non-aqueous electrolyte was not frozen.

devices for outdoors or transport devices for electric vehicles are highly developed.

INDUSTRIAL APPLICABILITY

As described above, it is noted that the non-aqueous electrolyte secondary cell is useful because use of the above-described non-aqueous electrolyte allows the non-aqueous electrolyte secondary cell to maintain a large discharging capacity even at low temperatures such as −20° C. and −50° C. and prevents the discharging capacity of the cell from deteriorating noticeably during the flow of a large current in an amount of 1 C or more, without damaging characteristics such as charging/discharging capacities at room temperature, large energy densities, or cycle characteristics. Further, the non-aqueous electrolyte secondary cell can operate even at high temperature of 80° C., and has flame retardancy and self-extinguishing property, whereby industrial values as portable electronic devices used for outdoors or transport devices for electric vehicles are highly developed.

What is claimed is:

1. A non-aqueous electrolyte secondary cell comprising:
an anode including as an active substance a lithium complex oxide containing at least one transition metal;
a cathode;
a non-aqueous electrolyte in which an Li-salt is dissolved in an organic solvent as a supporting salt; and
a separator between the anode and the cathode, wherein the organic solvent contains a phosphazene derivative represented by the following formula (1):

TABLE 6

| | Non-aqueous electrolyte | | Discharging capacity holding rate Discharging at ordinary temperature | | Test for self extinguishing property/flame retardancy |
|---|---|---|---|---|---|
| | Composition of organic solvent (vol %) | Supporting salt (mol/l) | | Freezing point | |
| | γ-BL | Pz | LiPF$_6$ | | | |
| Example 7 | | | | | | |
| G-1 | 40 | 60 | 0.75 | 93 | −50° C. or less | flame retardancy |
| G-2 | 50 | 50 | 0.75 | 95 | −50° C. or less | flame retardancy |
| G-3 | 60 | 40 | 0.75 | 98 | −50° C. or less | flame retardancy |
| G-4 | 70 | 30 | 0.75 | 98 | −50° C. or less | flame retardancy |
| G-5 | 80 | 20 | 0.75 | 97 | −50° C. or less | flame retardancy |
| Comp. Example 5 | | | | | | |
| H-1 | 90 | 10 | 0.75 | 95 | −50° C. or less | flame retardancy |
| H-2 | 30 | 70 | 0.75 | 75 | −50° C. or less | flame retardancy |
| H-3 | 95 | 5 | 0.75 | — | −50° C. or less | flame retardancy |

From table 6, it can be noted that, even when high crystalline carbon materials are used as active substances for a cathode, the above-described non-aqueous electrolyte has affinity with the high crystalline carbon materials and provides discharging capacity at ordinary temperature, and because the non-aqueous electrolytes does not freeze even at low temperature of −50° C., discharging characteristics at low temperature can be ensured. Further, since the non-aqueous electrolyte also provides the non-aqueous electrolyte secondary cell with flame retardancy and self-extinguishing property, industrial values as portable electronic

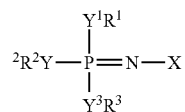

Formula (1)

wherein each of $R^1$, $R^2$ and $R^3$ represents a monovalent substituent or a halogen element, X represents an organic group (3)(A) or (3)(C), and $Y^1$, $Y^2$ and $Y^3$ independently represent a divalent connecting group, a divalent element or a single bond, provided that when $Y^2$ represents a divalent connecting group or a divalent element, $Y^2$ contains sulfur or selenium:

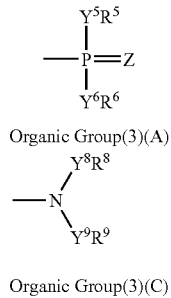

Organic Group(3)(A)

Organic Group(3)(C)

wherein, when X is organic group (3)(A), each of $R^5$ and $R^6$ represents a monovalent substituent or a halogen element, $Y^5$ and $Y^6$ independently represent a divalent connecting group, a divalent element or a single bond, Z represents a divalent group or a divalent element, at least one of $Y^5$, $Y^6$ and Z is oxygen, and wherein $R^1$ to $R^3$, $R^5$ and $R^6$ are the same, wherein, when X is organic group (3)(C), each of $R^8$ and $R^9$ represents a monovalent substituent or a halogen element, $Y^8$ and $Y^9$ independently represent a divalent connecting group, a divalent element or a single bond, at least one of $Y^8$ and $Y^9$ is oxygen, and wherein $R^1$ to $R^3$, $R^8$ and $R^9$ are the same, and wherein the organic solvent comprises from 15 to 60 vol % of a cyclic carbonic ester, from 10 to 80 vol % of a non-cyclic ester, and from 1.5 to 50 vol % of the phosphazene derivative.

2. The non-aqueous electrolyte secondary cell of claim 1, which includes $LiPF_6$ as the supporting salt and ethylene carbonate as the cyclic carbonic ester, and in which a volume percentage of the phosphazene derivative in the organic solvent is from 1.5 to 2.5 vol %.

3. The non-aqueous electrolyte secondary cell of claim 1, which includes $LiPF_6$ as the supporting salt and ethylene carbonate as the cyclic carbonic ester, and in which a volume percentage of the phosphazene derivative in the organic solvent is greater than 2.5 vol % and no more than 50 vol %.

4. The non-aqueous electrolyte secondary cell of claim 1, wherein the cyclic carbonic ester is at least one of ethylene carbonate (EC), propylene carbonate (PC), and butylene carbonate (BC).

5. The non-aqueous electrolyte secondary cell of claim 1, wherein the non-cyclic ester is at least one of dimethyl carbonate (DMC), diethyl carbonate (DEC), and ethylmethyl carbonate (EMC).

6. The non-aqueous electrolyte secondary cell of claim 1, wherein the organic solvent comprises from 15 to 60 vol % of ethylene carbonate (EC) cyclic carbonic ester, from 10 to 50 vol % of diethyl carbonate (DEC) non-cyclic ester, and from 3 to 50 vol % of the phosphazene derivative.

7. The non-aqueous electrolyte secondary cell of claim 1, wherein the cathode is one using, as an active substance, a carbon material mainly containing graphite and in which the organic solvent comprises from 15 to 60 vol % of ethylene carbonate (EC) cyclic carbonic ester, from 5 to 50 vol % of dimethyl carbonate (DMC) or diethyl carbonate (DEC) non-cyclic esters, from 5 to 30 vol % of ethylmethyl carbonate (EMC) non-cyclic ester, and from 1.5 to 50 vol % of the phosphazene derivative.

8. The non-aqueous electrolyte secondary cell of claim 7, which includes $LiPF_6$ as the supporting salt, and in which a volume percentage of the phosphazene derivative in the organic solvent is from 1.5 to 2.5 vol %.

9. The non-aqueous electrolyte secondary cell of claim 7, which includes $LiPF_6$ as the supporting salt, and in which a volume percentage of the phosphazene derivative in the organic solvent is from 2.5 to 50 vol %.

10. A non-aqueous electrolyte secondary cell of comprising:
an anode including as an active substance a lithium complex oxide containing at least one transition metal;
a cathode;
a non-aqueous electrolyte in which an Li-salt is dissolved in an organic solvent as a supporting salt; and
a separator between the anode and the cathode, wherein the organic solvent contains a phosphazene derivative represented by the following formula (1):

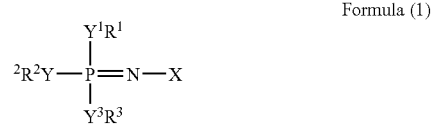

Formula (1)

wherein each of $R^1$, $R^2$ and $R^3$ independently represent represents a monovalent substituent or a halogen element, X represents an organic group (3)(A) or (3)(C), and $Y^1$, $Y^2$ and $Y^3$ independently represent a divalent connecting group, a divalent element or a single bond, provided that when $Y^2$ represents a divalent connecting group or a divalent element, $Y^2$ contains sulfur or selenium:

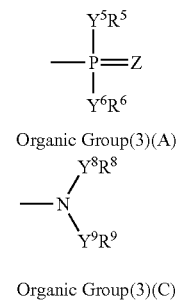

Organic Group(3)(A)

Organic Group(3)(C)

wherein, when X is organic group (3)(A), each of $R^5$ and $R^6$ represents a monovalent substituent or a halogen element, $Y^5$ and $Y^6$ independently represent a divalent connecting group, a divalent element or a single bond, Z represents a divalent group or a divalent element, at least one of $Y^5$, $Y^6$ and Z is oxygen, and wherein $R^1$ to $R^3$, $R^5$ and $R^6$ are the same, and wherein, when X is organic group (3)(C), each of $R^8$ and $R^9$ represents a monovalent substituent or a halogen element, $Y^8$ and $Y^9$ independently represent a divalent connecting group, a divalent element or a single bond, at least one of $Y^8$ and $Y^6$ is oxygen, and wherein $R^1$ $R^3$, $R^8$ and $R^9$ are the same, and wherein the cathode uses, as an active substance, a carbon material whose value d at a (002) lattice surface is not smaller than 3.35 Å and not greater than 3.37 Å, and the organic solvent includes from 40 to 90 vol % of γ-butyrolactone (γ-BL), and from 10 to 60 vol % of the phosphazene derivative.

* * * * *